United States Patent [19]

Tarumi et al.

[11] 4,186,606
[45] Feb. 5, 1980

[54] APPARATUS FOR MEASURING TEMPERATURE

[75] Inventors: Noriyoshi Tarumi, Tama; Kenji Ueno, Hachioji; Hirofumi Sakaguchi, Akigawa, all of Japan

[73] Assignee: Konishiroku Photo Industry Co., Ltd., Tokyo, Japan

[21] Appl. No.: 896,215

[22] Filed: Apr. 13, 1978

[30] Foreign Application Priority Data

Apr. 21, 1977 [JP] Japan .................................. 52-45159

[51] Int. Cl.$^2$ ............................................ G01K 1/14
[52] U.S. Cl. .................................................... 73/351
[58] Field of Search .............. 73/351, 362 R, 362 AR, 73/362 SC

[56] References Cited

U.S. PATENT DOCUMENTS

| 3,648,522 | 3/1972 | Hafeli et al. ............................ 73/351 |
| 3,879,594 | 4/1975 | Shillito ................................ 73/351 X |
| 3,888,622 | 6/1975 | Thehu ................................. 73/351 X |
| 4,074,575 | 2/1978 | Bergman et al. .................... 73/351 X |

Primary Examiner—Jerry W. Myracle
Attorney, Agent, or Firm—James E. Nilles

[57] ABSTRACT

An apparatus for measuring a temperature comprising a temperature measuring element. Said temperature measuring element is arranged closely to a surface of an article whose temperature is to be measured, an electric property of said temperature measuring element being varied corresponding to a temperature variation, and lead wires of said temperature measuring element are arranged so as to stretch closely to and along by the surface of said article.

13 Claims, 5 Drawing Figures

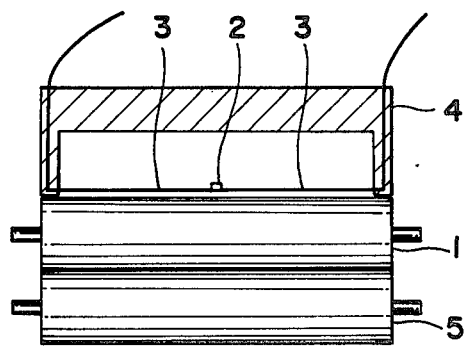
F I G. 2
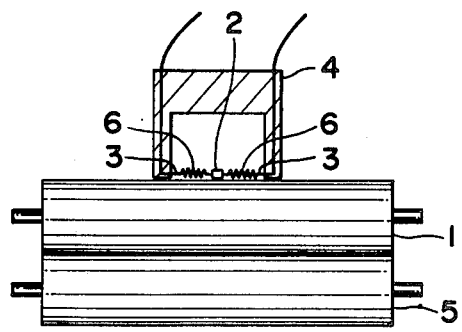
F I G. 4
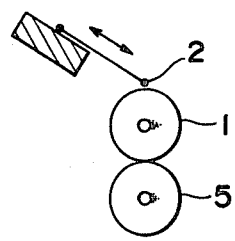
F I G. 5

APPARATUS FOR MEASURING TEMPERATURE

This invention relates to an apparatus for measuring a temperature wherein a temperature measuring element such as a thermistor, etc., is utilized whose electric property varies corresponding to a temperature variation.

Generally in a heating apparatus, it is often necessary to maintain its heating temperature at a predetermined value. For accomplishing the above purpose, such a method is widely adopted that a temperature of a portion to be heated in the heating apparatus is measured by a temperature measuring element such as a thermistor, etc., whose electric resistance varies corresponding to a temperature variation so that a voltage corresponding to the measured temperature is generated. Said voltage is utilized as a controlling signal for controlling a power supply to an electric heating element. In order to measure the temperature accurately by the temperature measuring element, said temperature measuring element had better to contact with a surface of a heating article. Various problems are raised, however, in case the heating article is a moving one.

A heating roller, for example, is conveniently adopted as a heating apparatus for fixing in an electronic copying machine. Said heating roller together with a matching press roller rotate and feed a transfer paper. The transfer paper is heated at this time by said heating roller and a toner image is fixed thereon. In order to execute the fixing without any problem, the temperature on the surface of said heating roller has to be maintained in a narrow temperature range such as 150° C.-190° C., for example. For the above purpose, it has hitherto been proposed to use an apparatus for measuring a temperature wherein a thermistor is mounted on a machine frame so that it contacts with the surface of the heating roller, and a controlling signal obtained therefrom controls a heating source of said heating roller such as an infrared ray lamp contained in the heating roller, for example.

In such a construction as above, however, the thermistor, keeping in contact with said heating roller, travels relatively on the surface of said heating roller when said roller rotates, so that the surface of the heating roller is scratched, and if the outer surface of the roller is coated with a Teflon film, said Teflon film is torn off, and a pattern of line is put on a copied image. In addition, the thermistor becomes to be worn out and broken by the heating roller. In case foreign substances are laid between the surface of the heating roller and the thermistor, it is impossible to measure an exact temperature of the surface of the heating roller. For example, a toner on the surface of the heating roller is accumulated on the contacting portion of the thermistor, hence the sensitivity of the thermistor deteriorates so that the heating roller becomes to be overheated. Moreover, since said toner is molten, the thermistor is adhered on the surface of the heating roller by the molten toner when the roller has come to stop, and then the thermistor may be broken when the roller is restarted. Also, it is not easy to remove the toner accumulated on the thermistor. When the temperature of the heating roller drops, the transfer paper is apt to wind around the heating roller, and said transfer paper collides with the thermistor, consequently it is feared that the position of the thermistor is shifted, and a variation of sensitivity as well as a destruction of the thermistor may be caused. Furthermore, it is difficult to maintain such a condition for a long time that the thermistor touches the heating roller lightly, therefore the thermistor becomes finally to be separated from the surface of the heating roller. These circumstances are all the same when a thermocouple is used in place of the thermistor.

In order to avoid various problems caused when the temperature measuring element contacts with a moving surface of a heating article as described above, said temperature measuring element had better to be mounted closely to a surface of heating article but without contacting therewith. However, such an arrangement that said temperature measuring element is merely separated from the surface of the heating article has such drawbacks that an air layer is laid between them so that a follow-up by the temperature measuring element after the variation of surface temperature of the heating article is weak and response thereby is slow. Consequently, said arrangement is not suitable for a practical use as a temperature measuring apparatus in case the surface temperature of said heating article has to be controlled highly precisely. In case of a temperature controlling apparatus so arranged, for example, that it contains a temperature measuring apparatus in which a thermistor is mounted apart from a surface of a heating roller, and a voltage signal obtained from said temperature measuring apparatus is utilized as a controlling signal for controlling an output of an infrared ray lamp which is a heat source of said heating roller, so that the surface temperature of said heating roller can be maintained at a predetermined temperature of 180° C., a variation with time of the surface temperature of said heating roller right after a heating is started by said infrared ray lamp is as shown in a chart of FIG. 1. In the meantime, said surface temperature was measured by a thermocouple which contacts with said surface.

As is understood from said chart, there is a huge overshoot, and a drifting stage is long so that a considerably long time is needed before reaching a steady state, moreover a large ripple is still existing even in the steady state. As a result, in case of an electronic copying machine using such a temperature controlling apparatus as above, a so-called hot operation for a long time is needed, and temperature variations of the heating roller, for example, a temperature drop of the heating roller due to the heating of the transfer paper, or a temperature rise of the heating roller due to a temperature rise inside of the copying machine, can not be compensated promptly, hence a desired effect of fixing can not be accomplished.

One object of this invention is to obviate said disadvantages by providing a temperature measuring apparatus which has a temperature measuring element separated from a surface of an article whose temperature is to be measured, and is superior in a follow-up after the temperature variation of said article as well as quick in a response thereto.

Another object of this invention is to provide a temperature measuring apparatus in a compact size which is easy to be arranged and capable of a stabilized operation.

A further object of this invention is to provide a temperature measuring apparatus which is suitable for a controlling signal generating apparatus in an apparatus for controlling a temperature of a heating article.

Additional objects as well as features of this invention will be apparent from the following description in conjunction with the accompanying drawings, in which, FIG. 1 is a characteristic curve showing a temperature variation with time of a heating roller in case a temperature is controlled by a temperature measuring element of non-contacting type;

FIG. 2 is a schematic view of an embodiment of a temperature measuring apparatus of this invention;

FIG. 4 is a schematic view of another embodiment of this invention; and

FIG. 5 is a schematic view showing an arrangement of a temperature measuring element.

Figure 1:
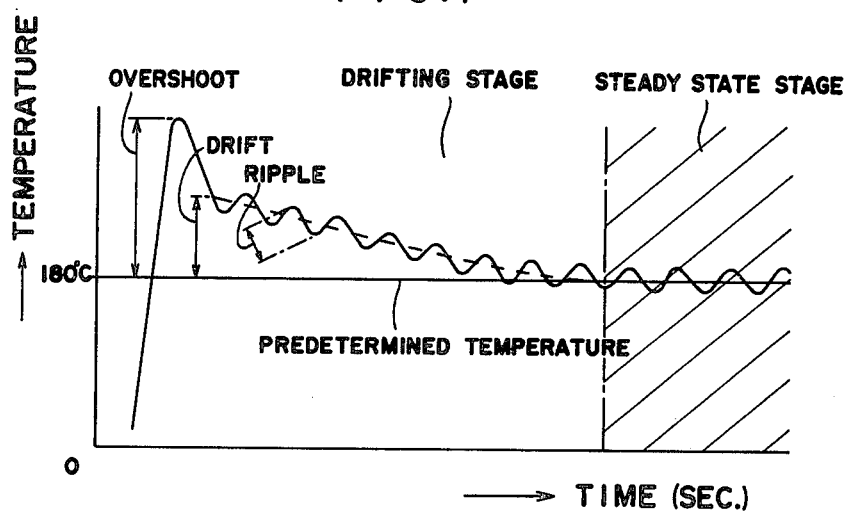

In FIG. 2, reference numeral 1 shows a heating roller consisting of a hollow aluminum roller having, for example, a 40 mm outer diameter, a 300 mm length and a 34 mm inner diameter whose outer surface is treated with a Teflon coating, and inside of which an infrared ray lamp of 900 W is arranged. A temperature measuring element 2 consisting of, for example, a diode type thermistor is so arranged as to be separated by about 1 mm from the outer surface of said heating roller 1 at the center in the longitudinal direction thereof. A pair of lead wires 3, 3 of said thermistor 2 are so arranged that they stretch in opposite directions respectively to form a straight line along by the outer surface of said heating roller 1 so as to be separated also by about 1 mm from said surface.

A long channel shaped supporting member 4 having, for example, an approximately equal leg-to-leg distance to an overall length of said heating roller 1 is prepared, and said lead wires 3, 3 are stretched in a straight line between tips of both legs of said supporting member 4 in such a manner that said temperature measuring element 2 is positioned at the center between said tips, so that said temperature measuring element 2 is supported by said lead wires 3, 3. Then, this temperature measuring element assembly is fixed on a machine frame in such a manner that said temperature measuring element 2 as well as said lead wires 3, 3 are positioned separating from the surface of said heating roller 1 by about 1 mm. The length of said lead wires 3, 3 is 10 cm respectively, for example. In the meantime, 5 is a press roller consisting of a hollow aluminum roller lined with a silicone rubber which has, for example, a 40 mm outer diameter, a 300 mm length and a 30 mm inner diameter.

A temperature controlling apparatus of said heating roller 1 can be composed of an amplifier which amplifies a voltage signal from a temperature measuring apparatus of this invention and a relay which switches ON and OFF an electric current to a heat source of said heating roller 1 such as, for example, an infrared ray lamp contained in said roller 1 by judging whether or not an electric signal level from said amplifier is below a predetermined level corresponding to a predetermined temperature.

In the temperature measuring apparatus of this invention, every component is separated from the heating roller 1, so that various problems caused in case, for example, the temperature measuring element contacts with the heating roller, are not occurred naturally. In addition, an output of the temperature measuring element 2 becomes to vary with a sufficient responding speed for a practical use to follow after a variation of surface temperature of said heating roller 1. Generally speaking, on a surface of exposed and high-temperatured object, there exists a thin and high-temperatured layer of air whose temperature is controlled practically only by said surface temperature and varies faithfully to follow after the temperature variation of said surface. While the thickness of said high-temperatured air layer is various depending upon circumstances it is so in case of said heating roller 1. In this invention, not only the temperature measuring element 2 but also lead wires 3, 3 are positioned closely to the surface of said heating roller 1, so that said lead wires 3, 3 are located in said high-temperatured air layer. Accordingly, said lead wires 3, 3 as well as said temperature measuring element 2 vary temperature thereof to follow up faithfully after the temperature variation of the surface of said heating roller 1. Setting aside portions of lead wires 3, 3 which are contacting with said supporting member 4 as well as adjacent portions thereto, the temperature of portions of said lead wires connecting to said temperature measuring element 2 as well as adjacent portions thereto is identical with the temperature of said temperature measuring element 2 so that there is no temperature gradient therebetween, hence there is no possibility that the temperature of said temperature measuring element 2 escapes by being conducted through said lead wires 3, 3. Said lead wires 3, 3 have large overall heat-receiving surfaces which are also radiating surfaces in comparison with volumes thereof, therefore said lead wires conduct the heat to or away from said temperature measuring element 2 when the temperature on the surface of said heating roller 1 varies, so that the temperature of said temperature measuring element 2 can follow quickly after the temperature variation of said surface. Consequently, the output of said temperature measuring element 2 varies with a very quick responding speed according to the temperature variation on the surface of said heating roller 1 whose temperature is to be measured. In the meantime, the distance between said temperature measuring element 2 and the heating roller 1 is to be within a range of 0.2–3.5 mm, preferably 0.5–2.0 mm.

According to the temperature measuring apparatus of this invention, a controlling signal is generated instantly corresponding to the variation of the surface temperature of said heating roller 1 and applied to a temperature controlling apparatus, so that the surface temperature of said heating roller 1 is maintained at a predetermined temperature surely and highly precisely.

Figure 3:
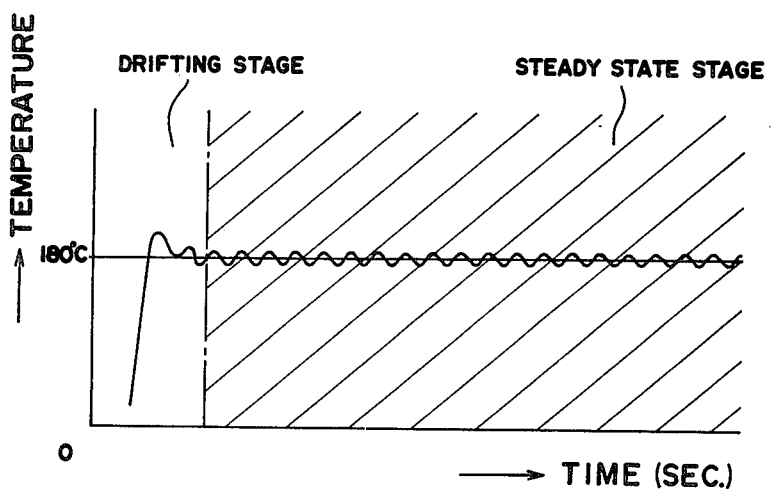
FIG. 3 is a characteristic curve in a same manner as FIG. 1 when an apparatus of this invention is used.

A characteristic curve showing a temperature variation with time of the heating roller by using the temperature measuring appartus of this invention under the same condition as FIG. 1 is shown in FIG. 3. Testing data of FIG. 3 are shown in comparison with FIG. 1 in the following table:

Table

|  | FIG. 1 | FIG. 3 |
| --- | --- | --- |
| Overshoot | 40° C. | 7° C. |
| Drift | 20° C. | 0° C. |
| Ripple | 10° C. | 4° C. |
| Necessary time to reach the steady state | 5 min. 10 sec. | 36 sec. |

By this invention, as is apparent from the above result, the overshoot is very small, and the drifting stage is short so that the steady state can be reached in a very short time compared with prior arts. This means that the response is very quick, and at the same time, the ripple is small. Therefore, this invention can be adopted for a practical use in order to control the temperature of heating roller in a heat-fixing apparatus of an electronic copying machine so that a desired fixing is accomplished surely.

In another embodiment of this invention, as shown in FIG. 4, lead wires 3, 3 of a temperature measuring element 2 are formed of coiling portions 6, 6 and said coiling portions 6, 6 together with said temperature measuring element 2 are arranged close to and along by the surface of a heating roller 1 so as to have about 1 mm distance therebetween.

By the above construction, a quite identical effect with the embodiment shown in FIG. 2 can be obtained. In the first embodiment, since lead wires 3, 3 are stretched to form a long straight line, said lead wires 3, 3 must be made of a considerably rigid material, or must have a large diameter. In the embodiment shown in FIG. 4, said lead wires 3, 3 can be of a desired material because said temperature measuring element 2 is supported by said coiling portions 6, 6 which have spring actions, and said temperature measuring element 2 can be positioned easily with a large shock-resistance in comparison with the first embodiment as described above. Because of its small size, it can measure a temperature of a heating article which has a small heating surface. Furthermore, a necessary heat-receiving area can be easily given to said lead wires 3, 3. In the lead wires 3, 3 in an embodiment in which a stainless steel wire having a 0.2 mm diameter is used, the inner diameter of coil portions 6, 6 is 1 mm, the number of turns is 10 and the length is 15 mm, respectively.

Almost identical result can be obtained in case snaky zigzag portions are formed in place of coiling portions 6, 6. A moderate effect can also be obtained when a bending portion including a coiling portion is formed on only one of lead wires 3, 3.

Furthermore, the responding speed of the temperature measuring element 2 can be increased by coating a heat-absorbing film on surfaces of said temperature measuring element 2 and said lead wires 3, 3 of this invention. Said film is preferably to be black colored and heat-resisting, and a paint so prepared can be adopted, for example, that a carbon black powder is dispersed in a heat-resisting binder resin such as an epoxy resin set in the presence of an acid anhydride catalyst, a silicone resin, or a polyimide-amide resin. The temperature measuring element assembly may be dipped in a paint liquid for said coating. In case the temperature measuring element 2 is a thermistor, the coated film is desirable to have a resistance value of not less than $10^6 \Omega$. A thick film is undesirable because the responding speed is decreased due to an increased heat capacity.

On arranging the temperature measuring element 2 and lead wires 3, 3 to oppose to said heating roller 1 in this invention, it is recommended that the temperature measuring element assembly is supported by a finely movable structure (not shown in the drawing) so as to be separated from the surface of the heating roller in a direction being not at right angle with the surface of said heating roller 1, as shown in FIG. 5, and then it approaches gradually so that it is positioned at the desired separating position easily.

While preferable embodiments of this invention have been explained as above, the temperature measuring apparatus of this invention can naturally be adopted not only as a part of temperature controlling apparatus, but also merely for measuring a temperature, so that it is adopted in a temperature watching apparatus and many other apparatuses. Moreover, it can be adopted for measuring the temperature of not only a heating roller but also of any optical article. A thermistor is most suitable for the temperature measuring element of this invention from various points of view although a thermocouple and other temperature measuring elements can be adopted besides a thermistor.

As explained above in detail, the apparatus of this invention can be constructed very simply, has no portion to contact with an article whose temperature is to be measured, can detect and measure the temperature and its variations of said article with a very high responding speed, can be constructed in a compact size so that a stabilized operation is obtained, and is easy to manufacture. Consequently, it is suitable for measuring temperature particularly of a moving article, in addition, it is suitable for a component of an automatic temperature controlling apparatus, hence a great advantage can be obtained when it is adopted for controlling the temperature of a heating roller for fixing in an electronic copying machine.

What is claimed is:

1. Apparatus for measuring the temperature of a surface of an article comprising:
   a thermally responsive temperature measuring element for providing an output signal related to the temperature of said element, an electrical property of said temperature measuring element varying in accordance with the temperature thereof,
   and means, comprising a supporting member and conductive elements connected between said supporting member and said temperature measuring element for supporting said temperature sensing element close to said surface so that said temperature measuring element is responsive to the temperature of said surface and for transmitting said output signal from said temperature measuring element, said conductive elements being located close to said surface and exposed to the same temperature as said temperature measuring element whereby no temperature gradient exists between said temperature measuring element and said conductive elements and heat escape from said temperature measuring element to said conductive elements is eliminated.

2. Apparatus according to claim 1 further including a heat-absorbing film provided on at least one of said temperature measuring element and said conductive elements.

3. Apparatus according to claim 1 wherein said conductive elements comprises electrical wires.

4. Apparatus according to claim 3 wherein said electrical wires are disposed generally parallel to said surface.

5. Apparatus according to claim 3 wherein each of said electrical wires is coiled about an axis disposed generally parallel to said surface.

6. Apparatus according to claim 1 wherein said temperature measuring element and said conductive elements are each spaced within a range of 0.2–3.5 mm from said surface.

7. Apparatus according to claim 1 wherein said surface is relatively movable with respect to said element and said means.

8. Apparatus for measuring the temperature of a surface of an article comprising:
   a thermally-responsive temperature measuring element for providing an output signal related to the temperature of said element, said temperature measuring element comprising an electrical device, an electrical property of which varies in accordance with the temperature of said device;

a supporting member;

and a pair of electrical conductors for supporting said element spaced from said supporting member and close to but spaced from said surface so that said element is responsive to the temperature of said surface and for transmitting said output signal from said element, said electrical conductors being located close to but spaced from said surface and exposed to the same temperature as said element whereby no temperature gradient exists between said element and said electrical conductors and heat escape from said element to said electrical conductors is eliminated.

9. Apparatus according to claim 8 further including a heat-absorbing film provided on at least one of said temperature measuring element and said electrical conductors.

10. Apparatus according to claim 8 wherein said electrical conductors are wires disposed generally parallel to said surface.

11. Apparatus according to claim 10 wherein at least one of said wires is coiled about an axis disposed generally parallel to said surface.

12. Apparatus according to claim 8 wherein said temperature measuring element and said electrical conductors are spaced within a range of 0.2–3.5 mm from said surface.

13. Apparatus according to claim 8 wherein said surface is relatively movable with respect to said supporting member, said element and said electrical conductors.

* * * * *